United States Patent
Okada et al.

(10) Patent No.: US 10,949,340 B2
(45) Date of Patent: Mar. 16, 2021

(54) BLOCK MAPPING SYSTEMS AND METHODS FOR STORAGE DEVICE

(71) Applicant: Cypress Semiconductor Corporation, San Jose, CA (US)

(72) Inventors: Shinsuke Okada, Kawashaki (JP); Sunil Atri, Cupertino, CA (US); Hiroyuki Saito, Kawasaki (JP)

(73) Assignee: Cypress Semiconductor Corporation, San Jose, CA (US)

( * ) Notice: Subject to any disclaimer, the term of this patent is extended or adjusted under 35 U.S.C. 154(b) by 29 days.

(21) Appl. No.: 15/984,071

(22) Filed: May 18, 2018

(65) Prior Publication Data
US 2018/0349268 A1    Dec. 6, 2018

Related U.S. Application Data

(63) Continuation of application No. 14/518,560, filed on Oct. 20, 2014, now Pat. No. 9,990,278.

(51) Int. Cl.
*G06F 12/02* (2006.01)
*G06F 12/10* (2016.01)

(52) U.S. Cl.
CPC .......... *G06F 12/0246* (2013.01); *G06F 12/10* (2013.01)

(58) Field of Classification Search
None
See application file for complete search history.

(56) References Cited

U.S. PATENT DOCUMENTS

| | | | |
|---|---|---|---|
| 8,028,120 B2 | 9/2011 | Mo et al. | |
| 8,566,510 B2 | 10/2013 | Weingarten | |
| 10,120,792 B1* | 11/2018 | Segal | G06F 3/0679 |
| 2004/0019761 A1 | 1/2004 | Fukuzumi | |
| 2009/0204651 A1 | 8/2009 | Rhoads et al. | |
| 2010/0180167 A1 | 7/2010 | Takasu | |
| 2012/0239855 A1* | 9/2012 | Tootoonchian | G06F 12/0246 |
| | | | 711/103 |

(Continued)

FOREIGN PATENT DOCUMENTS

CN    101346702 A    1/2009

OTHER PUBLICATIONS

International Search Report of the International Searching Authority for International Application No. PCT/US15/55112 dated Jan. 7, 2016; 2 pages.

(Continued)

*Primary Examiner* — Charles J Choi

(57) ABSTRACT

An overlaid erase block (EB) mapping scheme for a flash memory provides efficient wear-leveling and reduces mount operation latency. The overlaid EB mapping scheme maps a first type of EB onto one of a plurality of physical erase blocks, in a corresponding portion of the flash memory. The first type of EB includes a plurality of pointers. The overlaid EB mapping scheme also maps each of second and third types of EBs onto one of the physical EBs that is not mapped to the first type of EB. The second type of EBs store system management information and the third type of EBs store user data. When the flash memory is started up, the overlaid EB mapping scheme scans the corresponding portion to locate the first type of EB, locates the system EBs using the pointers, and locates the data EBs using the system management information.

14 Claims, 13 Drawing Sheets

(56) References Cited

U.S. PATENT DOCUMENTS

2014/0181376 A1   6/2014   Miyamoto et al.
2014/0281151 A1   9/2014   Yu et al.

OTHER PUBLICATIONS

USPTO Advisory Action for U.S. Appl. No. 14/518,560 dated Dec. 12, 2016, 3 pages.
USPTO Final Rejection for U.S. Appl. No. 14/518,560 dated Oct. 18, 2017, 10 pages.
USPTO Final Rejection for U.S. Appl. No. 14/518,560 dated Oct. 24, 2016, 8 pages.
USPTO Non-Final Rejection for U.S. Appl. No. 14/518,560 dated May 19, 2017, 7 pages.
USPTO Non-Final Rejection for U.S. Appl. No. 14/518,560 dated Jun. 28, 2016, 8 pages.
USPTO Notice of Allowance for U.S. Appl. No. 14/518,560 dated Feb. 26, 2018, 9 pages.
Written Opinion of the International Searching Authority for International Application No. PCT/US15/55112 dated Jan. 7, 2016; 4 pages.
SIPO Office Action for Application No. 2015800487744 dated Nov. 27, 2019; 9 pages.

\* cited by examiner

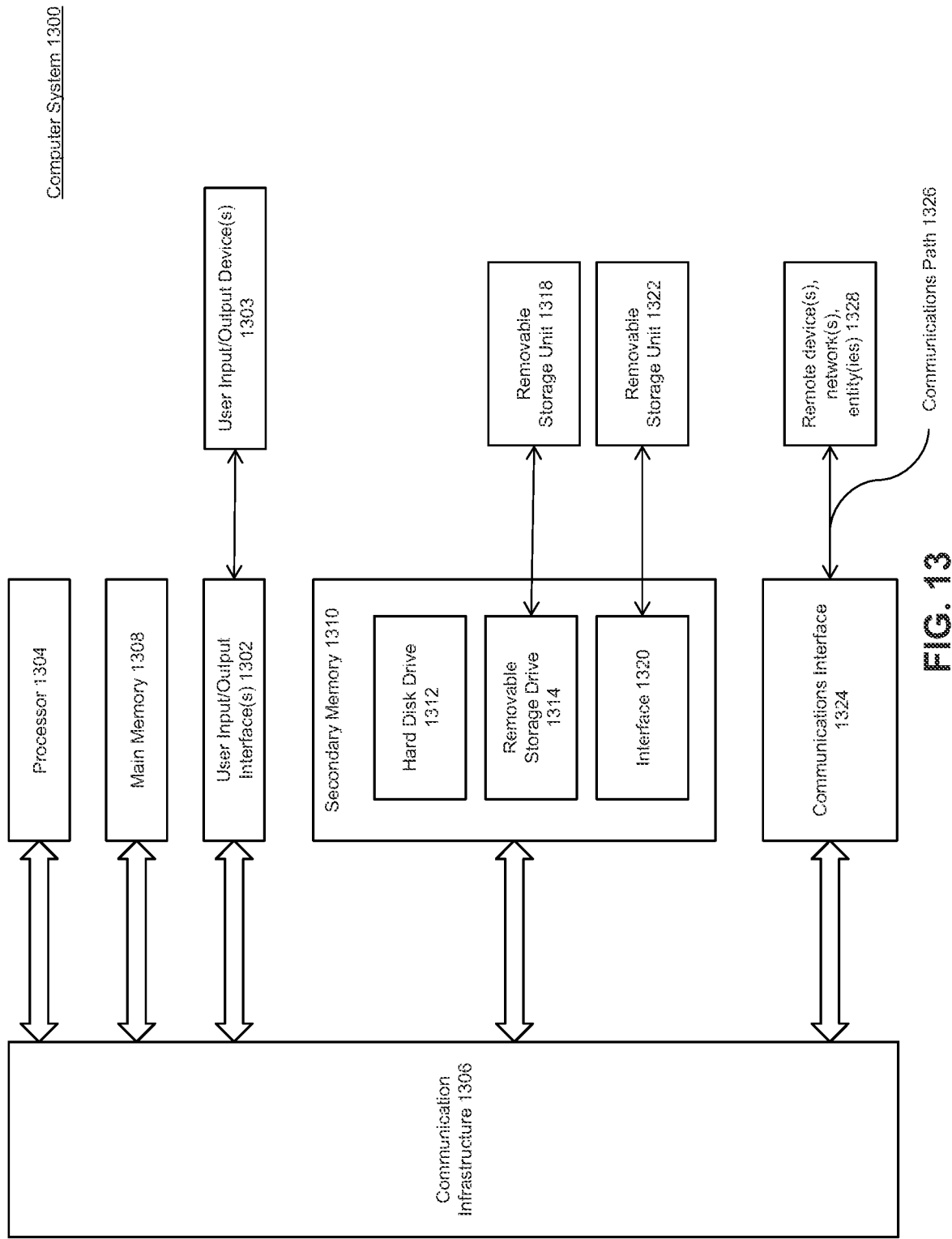

BLOCK MAPPING SYSTEMS AND METHODS FOR STORAGE DEVICE

CROSS-REFERENCE TO RELATED APPLICATION

This application is a Continuation of U.S. patent application Ser. No. 14/518,560, filed Oct. 20, 2014, which are incorporated by reference herein in their entirety.

Flash memory retains information stored therein without power, and thus is considered "non-volatile" memory. As such, flash memory has become increasingly popular for many types of devices including, for example, removable storage devices and mobile computing devices. Unlike other non-volatile memories that are one-time programmable (OTP), flash memories may be overwritten. Data may be stored in flash memory by erasing one or more blocks of memory cells therein and then writing to one or more memory cells within a block. The blocks of memory cells are usually referred to as erase blocks (EBs). The process of programming and erasing an erase block (EB) is referred to as a program/erase (P/E) cycle. Some characteristics of flash memory tend to degrade as EBs experience more P/E cycles. For example, the flash memory may not be able to store data for an infinitely long period of time without power. Moreover, the flash memory's programming and erasing characteristics may also degrade. The lifetime of a flash memory is therefore limited by a maximum number of P/E cycles experienced by each EB.

To prolong the lifetime of a flash memory, a flash file system (FFS) with an EB mapping scheme may be employed. One of the functions of the EB mapping scheme is to perform a technique known as wear-leveling (WL), wherein logical EBs are mapped onto physical EBs. In particular, frequently-written logical EBs are mapped onto physical EBs with low P/E cycles, and infrequently-written logical EBs are mapped onto physical EBs with high P/E cycles. The EB mapping scheme strives to distribute the P/E cycles evenly across the physical EBs, such that no EB fails prematurely. Different EB mapping schemes result in different WL efficiencies, wherein the WL efficiency may be considered as the uniformness of the P/E cycles distribution across the physical EBs.

Another function of an EB mapping scheme is to define how user data and system management information are allocated among and stored into the EBs. Among other things, the system management information keeps track of the physical location of user data in the flash memory. EBs that store user data may be referred to as data EBs. EBs that store system management information may be referred to as system EBs. The allocation of data EBs and system EBs dictates a mount latency of a mount operation of the FFS, affecting the boot time of the flash memory. When the flash memory starts up, the mount operation usually comprises locating the system EBs, which in turn point to the data EBs, such that user data can be made available to the user. The mount latency is the time taken to complete the mount operation.

SUMMARY

Provided herein are method, system and computer program product embodiments, and/or combinations and subcombinations thereof, for improving the endurance of a flash memory by providing efficient wear-leveling (WL), and enhancing the boot performance of the flash memory by reducing mount latency.

An embodiment includes an erase block (EB) mapping method for a flash memory, which includes a plurality of physical EBs. A super system EB, which includes a plurality of pointers, is mapped onto one of the physical EBs in a corresponding portion of the flash memory. Each of a plurality of system EBs and data EBs are mapped onto one of the physical EBs that is not mapped to the super system EB. The system EBs store system management information and the data EBs store user data. When the flash memory is started up, the corresponding portion is scanned to locate the super system EB. The system EBs are subsequently located using the pointers, and the data EBs are located using the system management information. One or more reserved EBs are also mapped onto the physical EBs. Each of the reserved EBs is an empty physical EB used for reclaiming a super system EB, a system EB or a data EB. If no reserved EB is available within the corresponding portion to reclaim the super system EB, either a system EB or a data EB is first reclaimed to generate a reserved EB within the corresponding portion.

Another embodiment includes a system with a flash memory and an EB mapping module. The flash memory includes a plurality of physical EBs. The EB mapping module maps a super system EB, which includes a plurality of pointers, onto one of the physical EBs in a corresponding portion of the flash memory. The EB mapping module maps each of a plurality of system EBs and data EBs onto one of the physical EBs that is not mapped to the super system EB. The system EBs store system management information and the data EBs store user data. When the flash memory is started up, the EB mapping module scans the corresponding portion to locate the super system EB. Subsequently, the EB mapping module locates the system EBs using the pointers and the data EBs using the system management information. The EB mapping module also maps one or more reserved EBs onto the physical EBs. Each of the reserved EBs is an empty physical EB used for reclaiming a super system EB, a system EB or a data EB. If no reserved EB is available within the corresponding portion of the flash memory to reclaim the super system EB, the EB mapping module first reclaims either a system EB or a data EB to generate a reserved EB within the corresponding portion.

A further embodiment includes a tangible computer-readable device having instructions stored thereon that, when executed by at least one computing device, cause the computing device to perform EB mapping operations. The EB mapping operations map a super system EB, which includes a plurality of pointers, onto one of a plurality of physical EBs in a corresponding portion of the flash memory. The EB mapping operations map each of a plurality of system EBs and data EBs onto one of the physical EBs that is not mapped to the super system EB. The system EBs store system management information and the data EBs store user data. When the flash memory is started up, the EB mapping operations scan the corresponding portion to locate the super system EB. Subsequently, the EB mapping operations locate the system EBs using the pointers and the data EBs using the system management information. The EB mapping operations also map one or more reserved EBs onto the physical EBs. Each of the reserved EBs is an empty physical EB used for reclaiming a super system EB, a system EB or a data EB. If no reserved EB is available within the corresponding portion to reclaim the super system EB, the EB mapping operations first reclaim either a system EB or a data EB to generate a reserved EB within the corresponding portion.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

FIG. 13 is an example computer system useful for implementing various embodiments.

Figure 1:
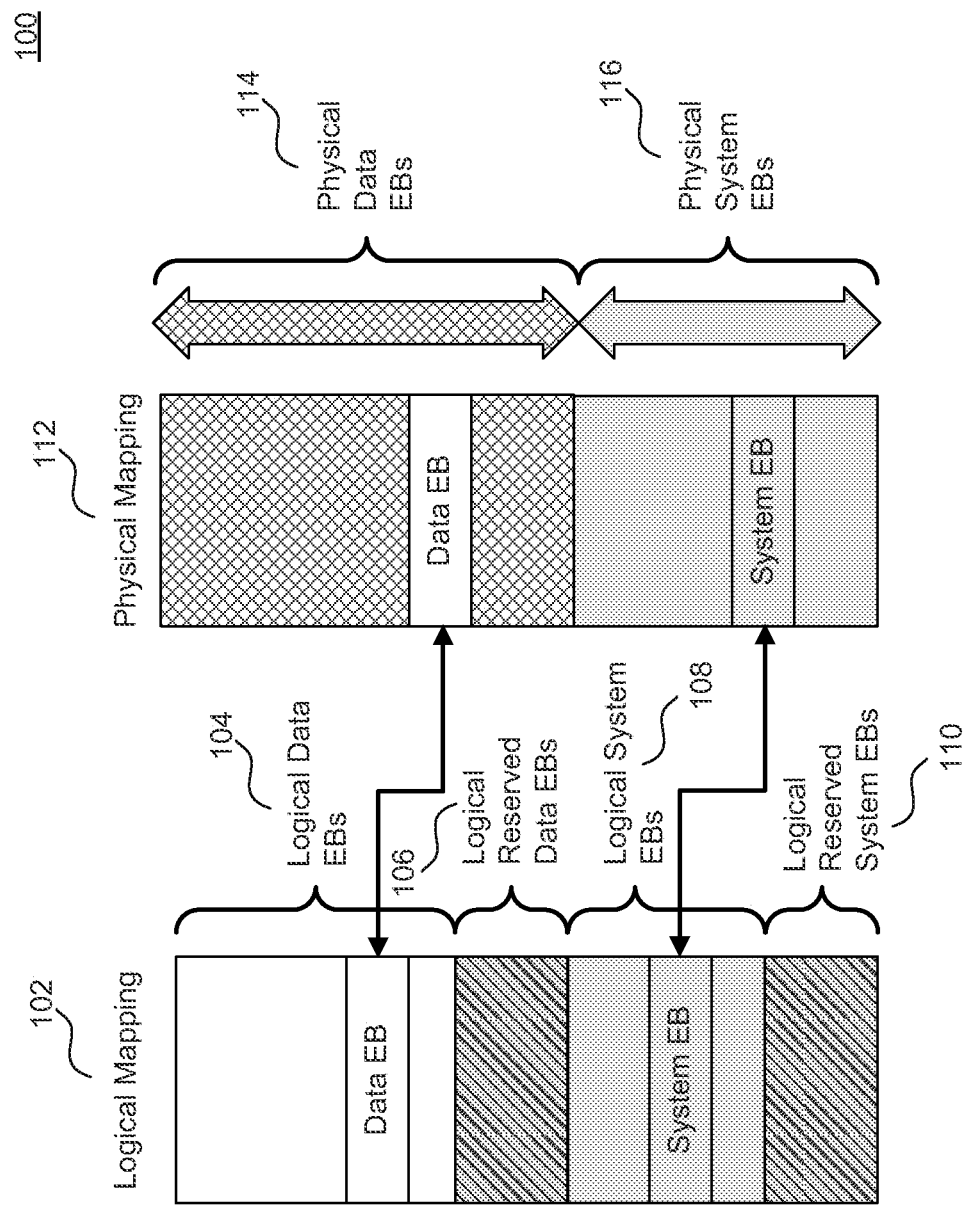
FIG. 1 illustrates an erase block (EB) mapping scheme, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Split EB Mapping Scheme

According to an embodiment, FIG. 1 illustrates an example of a split erase block (EB) mapping scheme 100, which may be incorporated into a flash file system (FFS) of a flash memory. Split erase EB mapping scheme 100 may be viewed as a logical mapping 102 or a physical mapping 112.

Logical mapping 102 depicts an example arrangement of logical data EBs 104, logical reserved data EBs 106, logical system EBs 108 and logical reserved system EBs 110, where each EB is a block of memory cells. Split EB mapping scheme 100 maps logical data EBs 104 and logical reserved data EBs 106 onto physical data EBs 114, and logical system EBs 108 and logical reserved system EBs 110 onto physical system EBs 116.

Physical mapping 112 depicts an example of the resulting arrangement of physical data EBs 114 and physical system EBs 116. In a flash memory with an FFS using a split EB mapping scheme, physical data EBs 114 and physical system EBs 116 typically occupy dedicated portions of the flash memory and do not share any EB, hence the term "split." Moreover, although not explicitly shown in FIG. 1, flash memories typically comprise relatively fewer physical system EBs 116, including reserved system EBs, than data EBs.

Logical data EBs 104 store user data, while logical system EBs store system management information, which, among other things, keeps track of the physical location of user data in the flash memory. In split EB mapping scheme 100, logical reserved data EBs 106 are empty EBs used for the garbage collection of logical data EBs 104, where garbage collection is a process of reclaiming memory cells that are no longer in use. During a garbage collection operation, one or more logical data EBs 104 may be reclaimed by transferring valid data within logical data EBs 104 into one or more logical reserved data EBs 106. Subsequently, the original logical data EBs 104 may be erased (i.e., reclaimed), forming new logical reserved data EBs 106. Similarly, one or more logical system EBs 108 may be reclaimed by transferring valid data within the logical system EBs 108 into one or more logical reserved system EBs 110. The original logical system EBs 108 may then be erased, forming new logical reserved system EBs 110.

Figure 2:
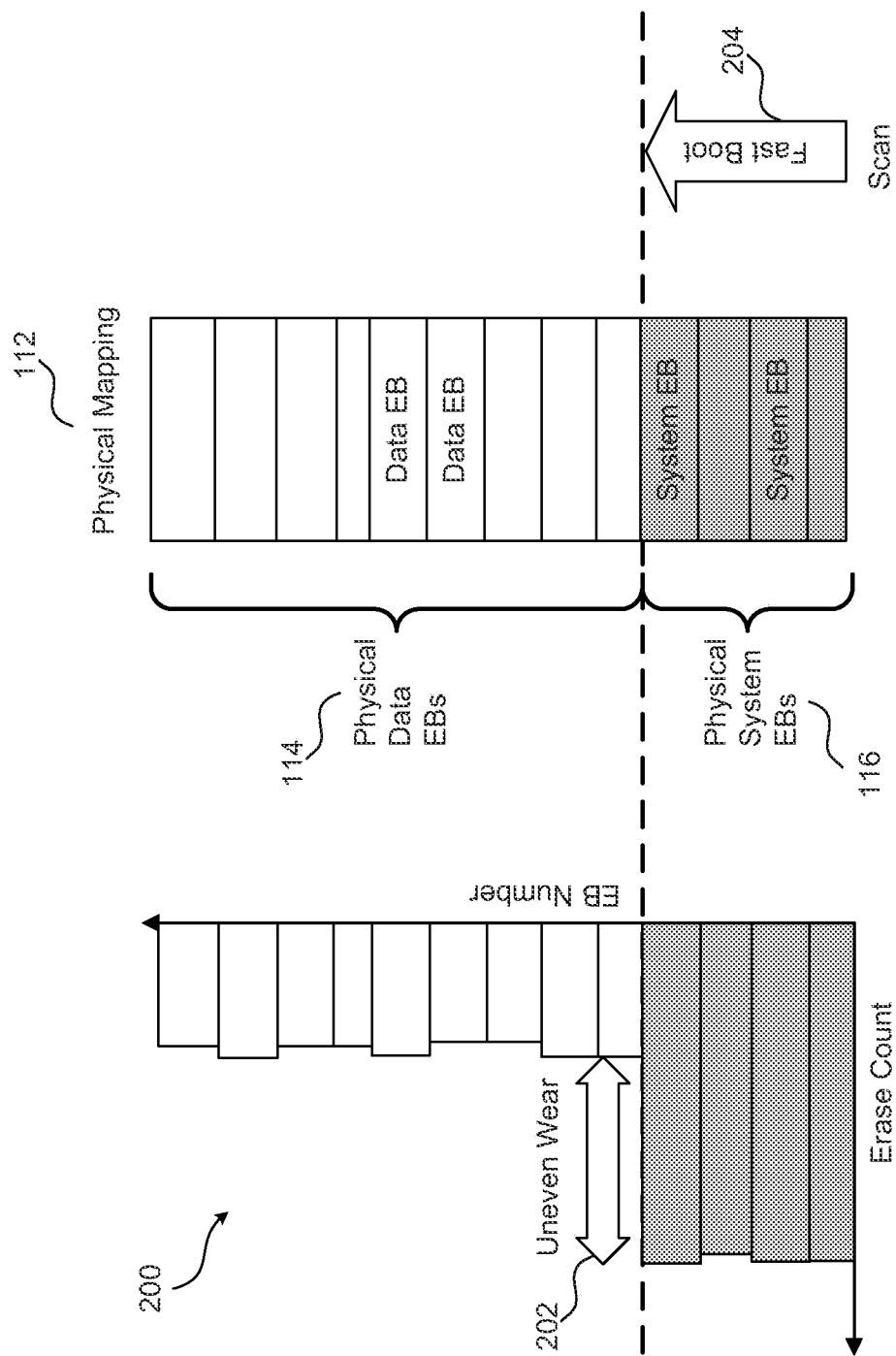
FIG. 2 illustrates EB erase counts and boot time of an EB mapping scheme, according to an example embodiment.

In FIG. 2, diagram 200 illustrates example erase counts corresponding to physical data EBs 114 and physical system EBs 116, after multiple program/erase (P/E) cycles. As shown by arrow 202, the erase counts for physical system EBs 116 may be relatively higher than the erase counts for physical data EBs 114, resulting in undesirable and uneven wear levels between the two portions. In this example, split EB mapping scheme 100 performs wear-leveling (WL) of data EBs and system EBs independently on each portion. In particular, during garbage collection, frequently-written logical data EBs are mapped onto reserved data EBs with low P/E cycles, and infrequently-written logical data EBs are mapped onto reserved data EBs with high P/E cycles. Similarly, frequently-written logical system EBs are mapped onto reserved system EBs with low P/E cycles, and infrequently-written logical system EBs are mapped onto reserved system EBs with high P/E cycles. Given that there is relatively fewer physical system EBs 116, physical system EBs 116 undergo higher P/E cycles than physical data EBs 114.

Split EB mapping scheme 100, however, allows a flash memory to have relatively faster boot time. During a mount operation, only a particular portion of the flash memory needs to be scanned, as indicated by arrow 204, to locate valid system EBs. Therefore, split EB mapping scheme 100 provides reduced mount latency, but inefficient WL across a flash memory.

Unified EB Mapping Scheme

Figure 3:
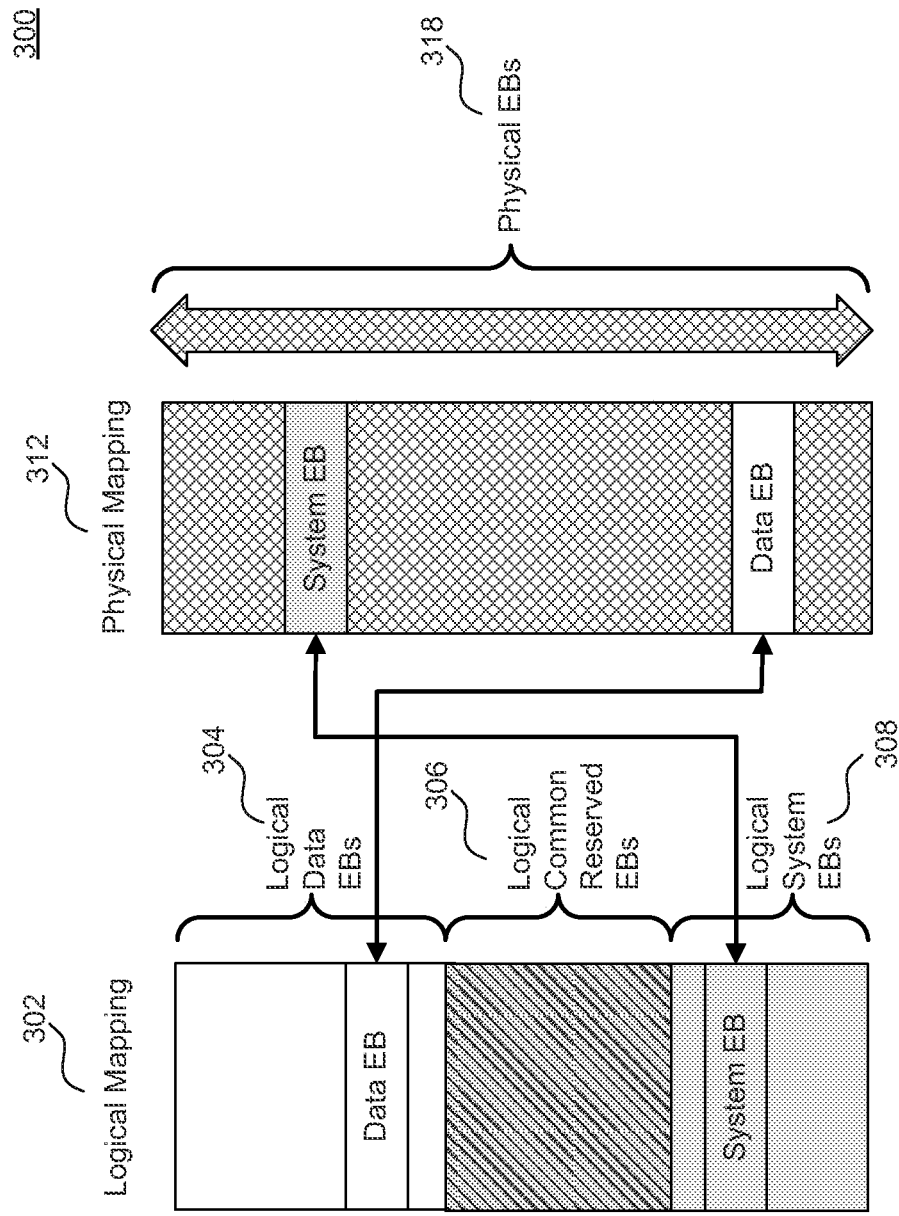
FIG. 3 illustrates an EB mapping scheme, according to an example embodiment.

According to an embodiment, FIG. 3 illustrates an example unified EB mapping scheme 300, which may be viewed as a logical mapping 302 or a physical mapping 312. Unlike split EB mapping scheme 100, as shown by logical mapping 302, unified EB mapping scheme 300 comprises a set of logical common reserved EBs 306, instead of separate reserved data EBs and reserved system EBs. Logical common reserved EBs 306 may be used for garbage collection of either logical data EBs 304 or logical system EBs 308. Furthermore, unified EB mapping scheme 300 maps logical data EBs 304, logical common reserved EBs 306 and logical systems EBs 308 onto any physical EBs 318. Unlike split EB mapping scheme 100, unified EB mapping scheme 300 does not include a demarcation between data EBs and system EBs in physical mapping 312.

Figure 4:
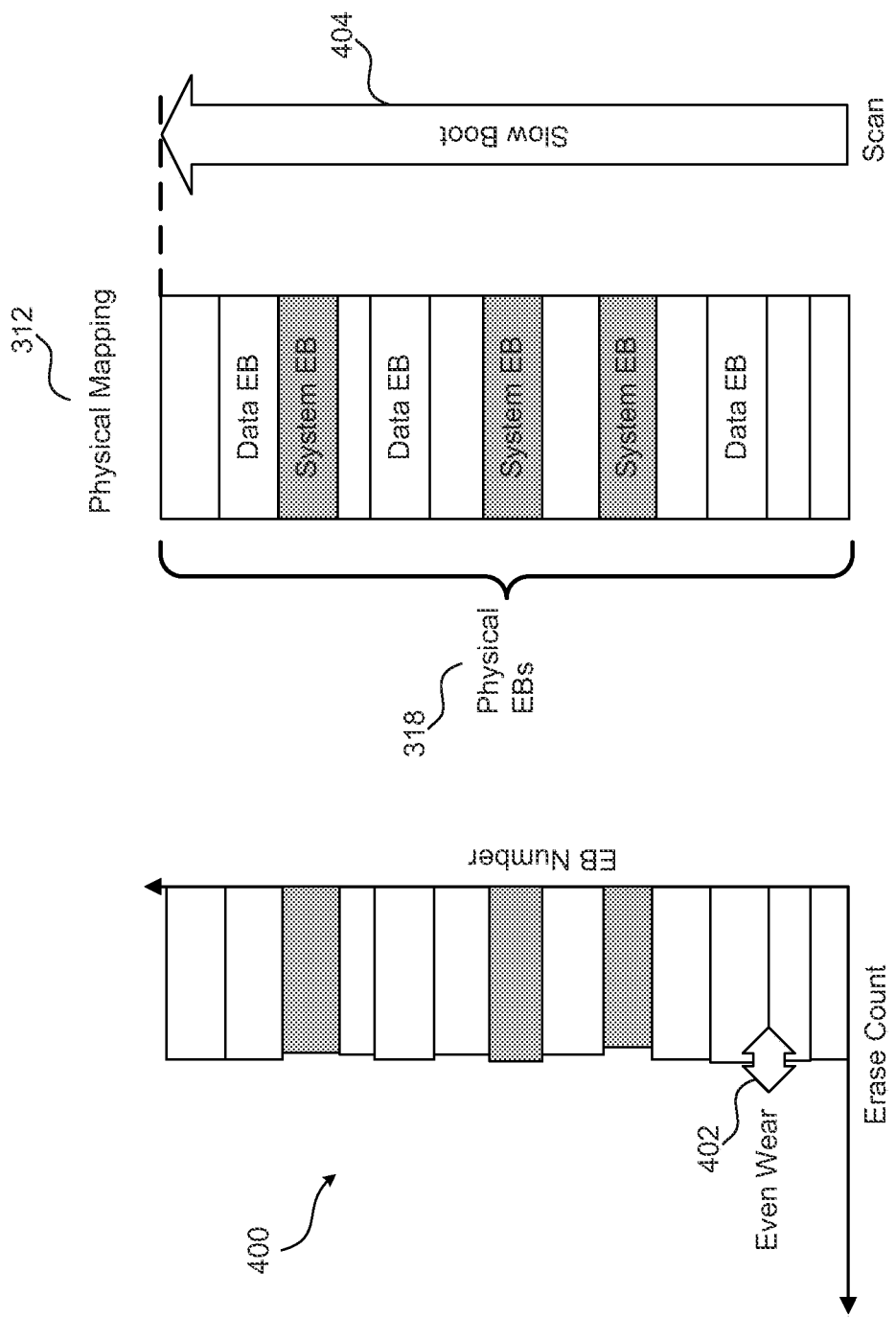
FIG. 4 illustrates EB erase counts and boot time of an EB mapping scheme, according to an example embodiment.

In FIG. 4, diagram 400 illustrates example erase counts for physical EBs 318. As indicated by arrow 402, unified EB mapping scheme 300 usually leads to an even wear across all the EBs. The virtually uniform erase counts result from the capability of the unified EB mapping scheme 300 to perform a WL operation across the flash memory, by mapping frequently-written logical system EBs 308 or logical data EBs 304 onto logical common reserved EBs 306 with low erase counts, and infrequently-written logical system EBs 308 or logical data EBs 304 onto logical common reserved EBs 306 with high erase counts.

The shortcoming of unified EB mapping scheme 300, however, is a relatively slower boot time indicated by arrow 404. The slower boot time is due to the fact that unified EB mapping scheme 300 needs to scan all the physical EBs 318 to locate valid system EBs during a mount operation. Thus, unified EB mapping scheme 300 provides efficient WL, but lengthy mount latency.

Overlaid EB Mapping Scheme

According to an example embodiment, an overlaid EB mapping scheme, which is capable of concurrently providing reduced mount latency and efficient WL, will now be described with respect to FIGS. 5 through 12.

Figure 5:
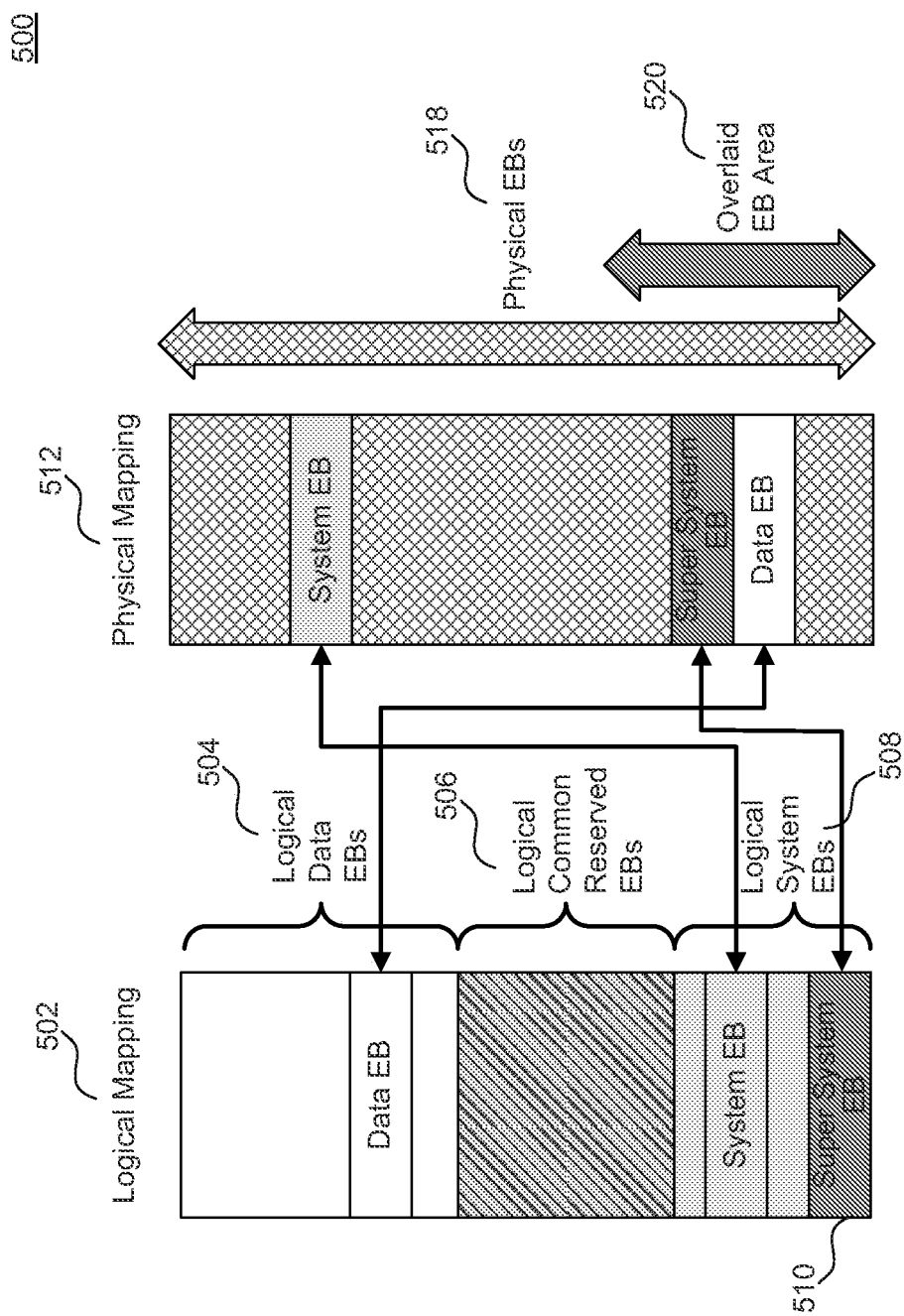
FIG. 5 illustrates an EB mapping scheme, according to an example embodiment.

FIG. 5 is a representation of an example overlaid EB mapping scheme 500, which is similar to unified EB mapping scheme 300 in FIG. 3, except that one of the EBs in the flash memory is a modified system EB. This modified system EB is shown as a super system EB 510 in FIG. 5. As will be apparent in the description that follows, super system EB 510 allows for a reduction in mount latency. In FIG. 5, as shown in logical mapping 502, overlaid EB mapping scheme includes a set of logical common reserved EBs 506. Overlaid EB mapping scheme 500 may use the common reserved EBs not only for the garbage collection of the data EBs and system EBs, but also for the garbage collection of super system EB 510. As in unified EB mapping scheme 300, logical data EBs 504 and logical system EBs 508 may be mapped onto any physical EBs 518, with the exception that overlaid EB mapping scheme 500 maps super system EB 510 onto a particular portion of the flash memory. In physical mapping 512, this particular portion is shown as being overlaid onto the physical EBs 518 and accordingly labeled as overlaid EB area 520.

Figure 6:
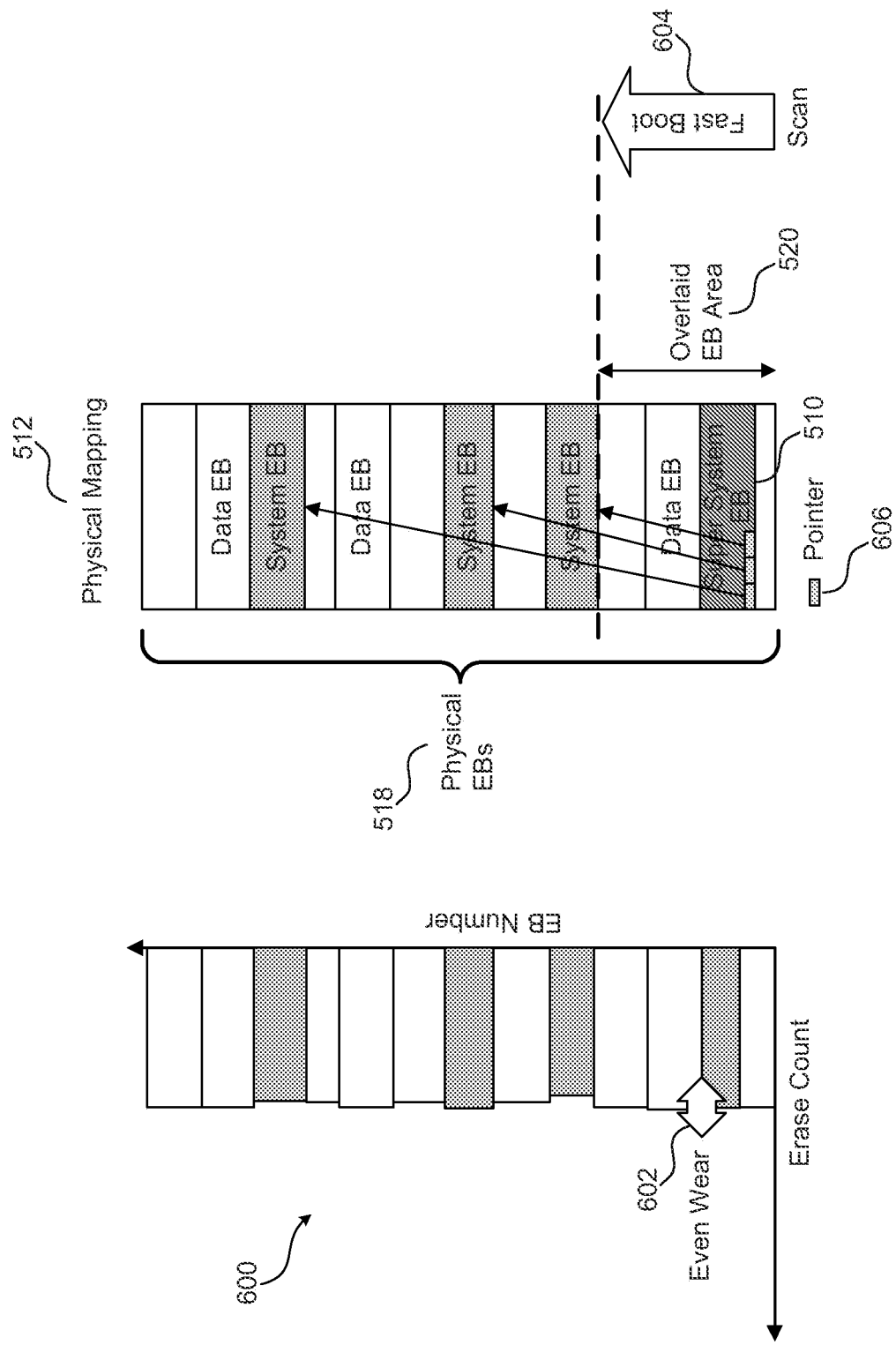
FIG. 6 illustrates EB erase counts and boot time of an EB mapping scheme, according to an example embodiment.

In FIG. 6, diagram 600 illustrates example erase counts for physical EBs 518. Given that overlaid EB mapping scheme 500 may perform a common WL operation across physical EBs 518 using the common reserved EBs, an even wear may be realized, as indicated by arrow 602. This is similar to unified EB mapping 300. However, unlike unified EB mapping 300, overlaid EB mapping scheme 500 may achieve relatively fast boot time, as indicated by arrow 604. This is because, during a mount operation, overlaid EB mapping scheme 500 only scans overlaid EB area 520 to locate super system EB 510, which includes multiple pointers 606 pointing to valid system EBs. Pointers 606 may include metadata, which may include, among other things, address information for valid system EBs. Therefore, once super system EB 510 is located, pointers 606 may be used to locate valid system EBs among physical EBs 518.

Figure 7:
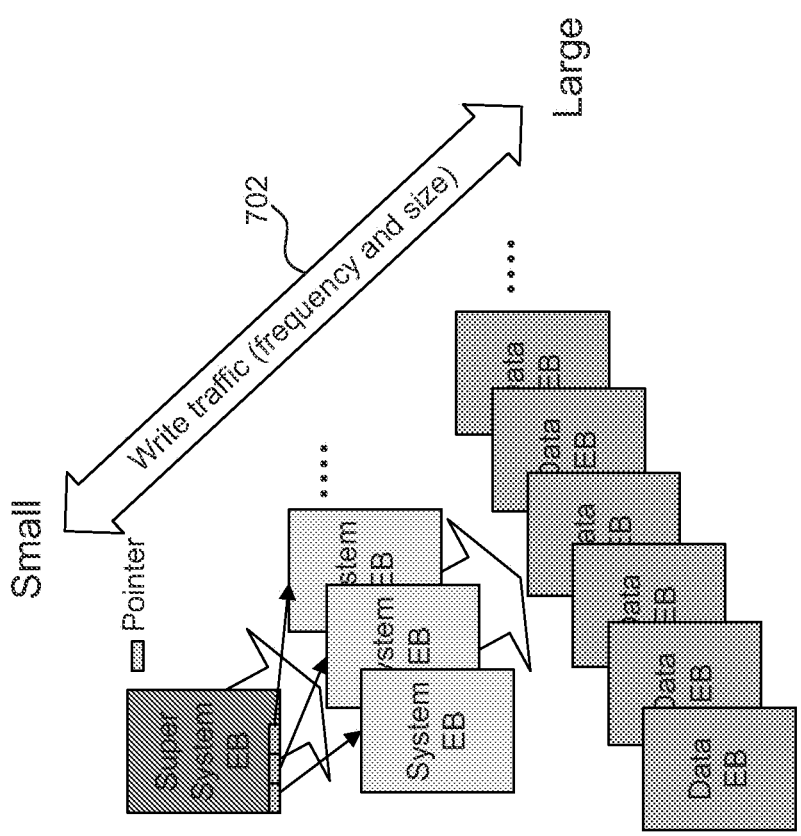
FIG. 7 is a representation of an addressing hierarchy of an EB mapping scheme, according to an example embodiment.

FIG. 7 is a depiction of an example addressing hierarchy 700 of overlaid EB mapping scheme 500. As indicated by arrow 702, data EBs typically undergo the highest write traffic or P/E cycles, followed respectively by system EBs and the super system EB. When one or more data EBs are erased, only the location information of the newly reclaimed EBs and the new data EBs are recorded within the system EBs. Thus, it takes longer, compared to data EBs, for system EBs to run out of free memory cells. Similarly, when system EBs are erased, the pointers within the super system EB are updated to point to the new system EBs. Consequently, it takes longer, compared to system EBs, for the super system EB to run out of free memory cells. This results in addressing hierarchy 700.

FIG. 7 also illustrates how an example flash memory typically has relatively fewer system EBs when compared to data EBs. Fewer system EBs implies not only faster boot time, but also more remaining EBs that may be used for data EBs. Thus, a flash memory with fewer system EBs may provide more space for user data. However, fewer system EBs also implies that the system EBs may undergo higher P/E cycles than data EBs. Therefore, manufacturers and users of flash memories usually need to make trade-offs between the number of system EBs and the allocation of data EBs, depending on their desirability for operational speed (i.e., lower number of system EBs and faster boot time) or endurance (i.e., higher number of system EBs and lower P/E cycles).

One skilled in the art would appreciate that, as the storage capacity of a flash memory increases (i.e., the number of erase blocks increases), one super system EB may not be able to store all the information needed to point to all valid system EBs. In such a case, a plurality of super system EBs may be used. The plurality of super system EBs may all be confined to a particular area of the flash memory, similar to overlaid EB area 520 in FIG. 5. During a mount operation, the particular area may be scanned to locate all the super system EBs, which point to the valid system EBs.

Alternatively, another modified system EB—a super super system EB, for example—may be used to point to the plurality of super system EBs. The super super system EB may be confined to a particular area, while the super system EBs may be located anywhere in the flash memory. During a mount operation, the particular area may be scanned to locate the super super system EB, which points to the super system EBs, which in turn point to the valid system EBs. One skilled in the art would further appreciate that, as the storage capacity of a flash memory increases even more, the tree concept of having one EB pointing to a plurality of EBs may be extended without expanding the area to be scanned during a mount operation.

Super System EB Garbage Collection Algorithm

Figure 8:
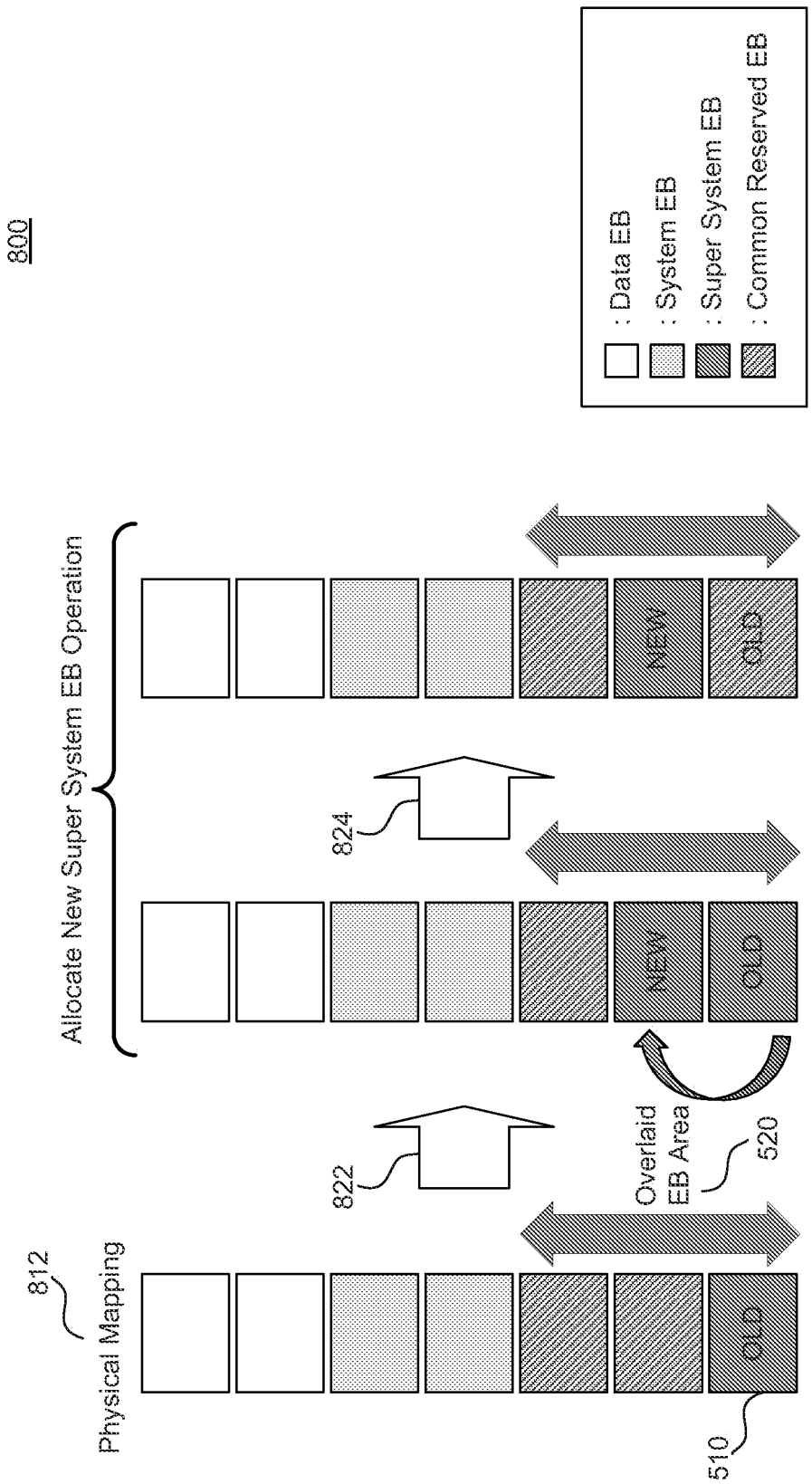
FIG. 8 illustrates a garbage collection of a super system EB, according to an example embodiment.
Figure 9:
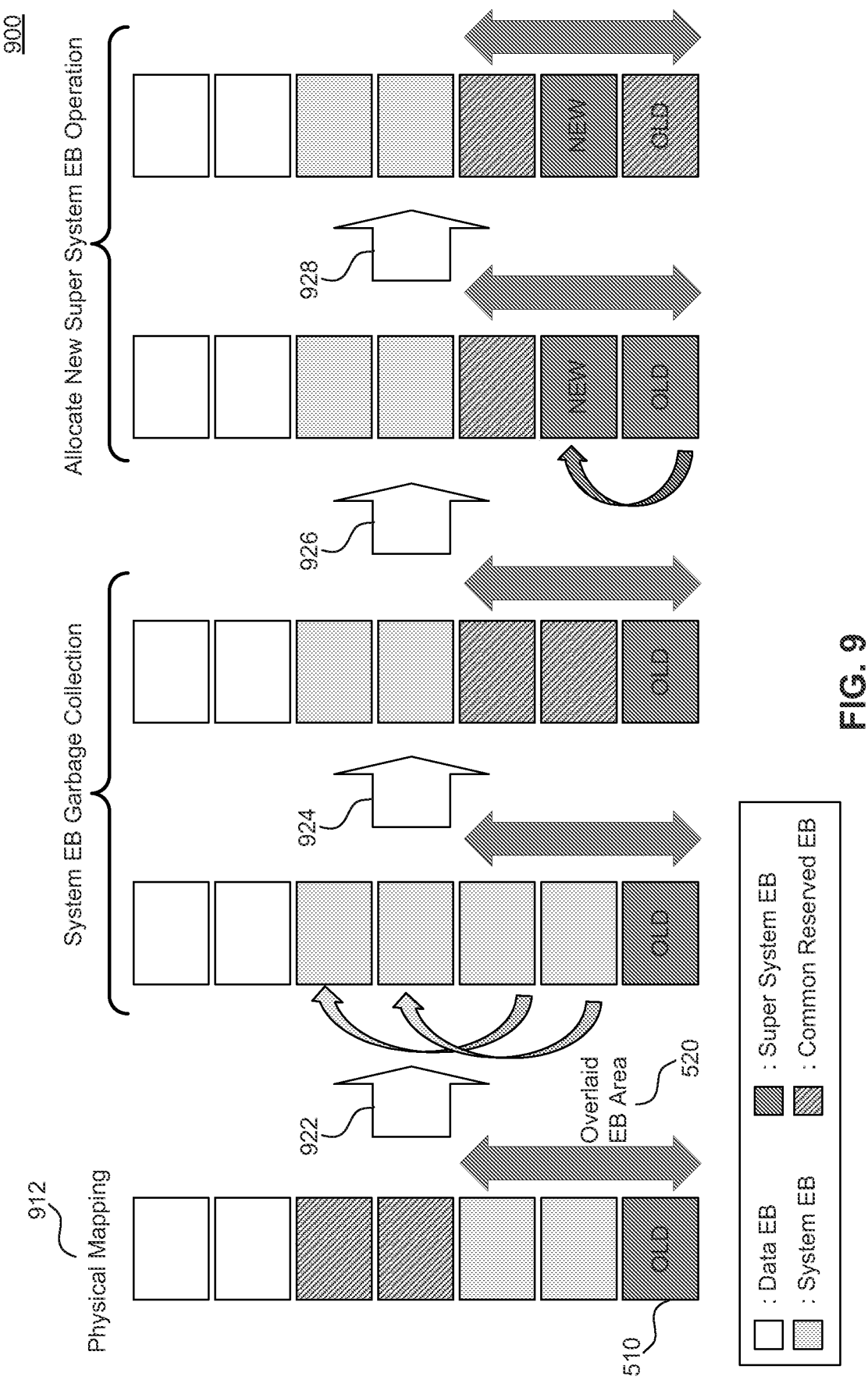
FIG. 9 illustrates a garbage collection of a super system EB, according to an example embodiment.
Figure 10:
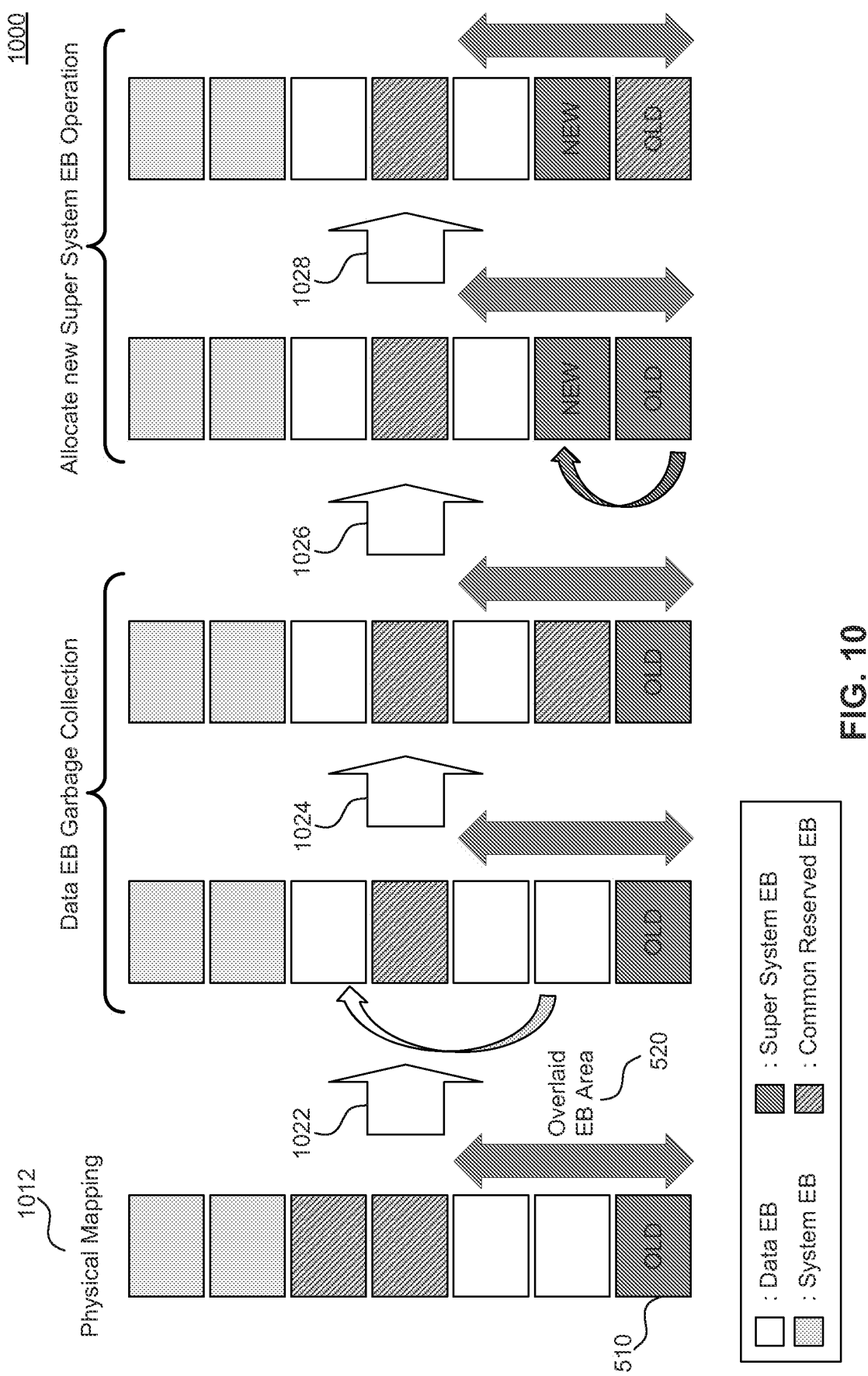
FIG. 10 illustrates a garbage collection of a super system EB, according to an example embodiment.

In one example, in an overlaid EB mapping scheme 500, it is ensured that super system EB 510 is mapped onto overlaid EB area 520. As a result, garbage collection of super system EB 510 should be carried out according to a specific algorithm. FIGS. 8 through 10 illustrate different example scenarios covered by such an algorithm for performing garbage collection of super system EB 510.

According to an embodiment, FIG. 8 shows an example garbage collection operation 800 of super system EB 510. Physical mapping 812 illustrates an example allocation of data EBs, system EBs, common reserved EBs and super system EB 510, after multiple P/E cycles. In this scenario, overlaid EB area 520 contains super system EB 510 and two common reserved EBs. Super system EB 510 is labeled as "OLD" because, for example, super system EB 510 may be full (i.e., may have run out of free memory cells). At step 822, garbage collection may be performed by allocating one of the common reserved EBs within overlaid EB area 520 and transferring valid data from the "OLD" super system EB to the allocated common reserved EB. Thus, a "NEW" super system EB is formed and remains within overlaid EB area 520 as required by overlaid EB mapping scheme 500. At step 824, the "OLD" super system EB may be erased to form a common reserved EB.

According to an embodiment, FIG. 9 shows another example garbage collection operation 900 of super system EB 510. Physical mapping 912 illustrates an example allocation of data EBs, system EBs, common reserved EBs and super system EB 510, after multiple P/E cycles. In this scenario, overlaid EB area 520 contains super system EB 510 and two system EBs. Similar to the scenario in FIG. 8, for example, super system EB 510 may be full and is labeled "OLD." However, in this example scenario, there is no common reserved EB within overlaid EB area 520 to readily perform garbage collection of the "OLD" super system EB. One or more common reserved EBs need to be generated first within overlaid EB area 520. Therefore, at step 922, one or more common reserved EBs outside of overlaid EB area 520 may be allocated to reclaim one or more of the system EBs that are within overlaid EB area 520. FIG. 9 shows, but is not limited to, two system EBs being reclaimed. At step 924, one or more common reserved EBs may then be generated by erasing the reclaimed system EBs. Subsequently, at step 926 one of the newly generated common reserved EBs may be allocated to reclaim the "OLD" super system EB, forming a "NEW" super system EB. At step 928, the "OLD" super system EB may be erased to form a common reserved EB within overlaid EB area 520.

According to an embodiment, FIG. 10 shows another example garbage collection operation 1000 of super system EB 510. Physical mapping 1012 illustrates an example allocation of data EBs, system EBs, common reserved EBs and super system EB 510, after multiple P/E cycles. In this example scenario, overlaid EB area 520 contains super system EB 510 and two data EBs. Similar to the scenario in FIG. 8, for example, super system EB 510 may be full and is labeled "OLD." However, in this example scenario, there is no common reserved EB within overlaid EB area 520 to readily perform garbage collection of the "OLD" super system EB. One or more common reserved EBs need to be generated first within overlaid EB area 520. Therefore, at step 1022, one or more common reserved EBs outside of overlaid EB area 520 may be allocated to reclaim one or more of the data EBs that are within overlaid EB area 520. FIG. 10 shows, but is not limited to, one data EB being reclaimed. At step 1024, one or more common reserved EBs may then be generated by erasing the reclaimed data EBs. Subsequently, at step 1026 one of the newly generated common reserved EBs may be allocated to reclaim the "OLD" super system EB, forming a "NEW" super system EB. At step 1028, the "OLD" super system EB may be erased to form a common reserved EB within overlaid EB area 520.

Figure 11:
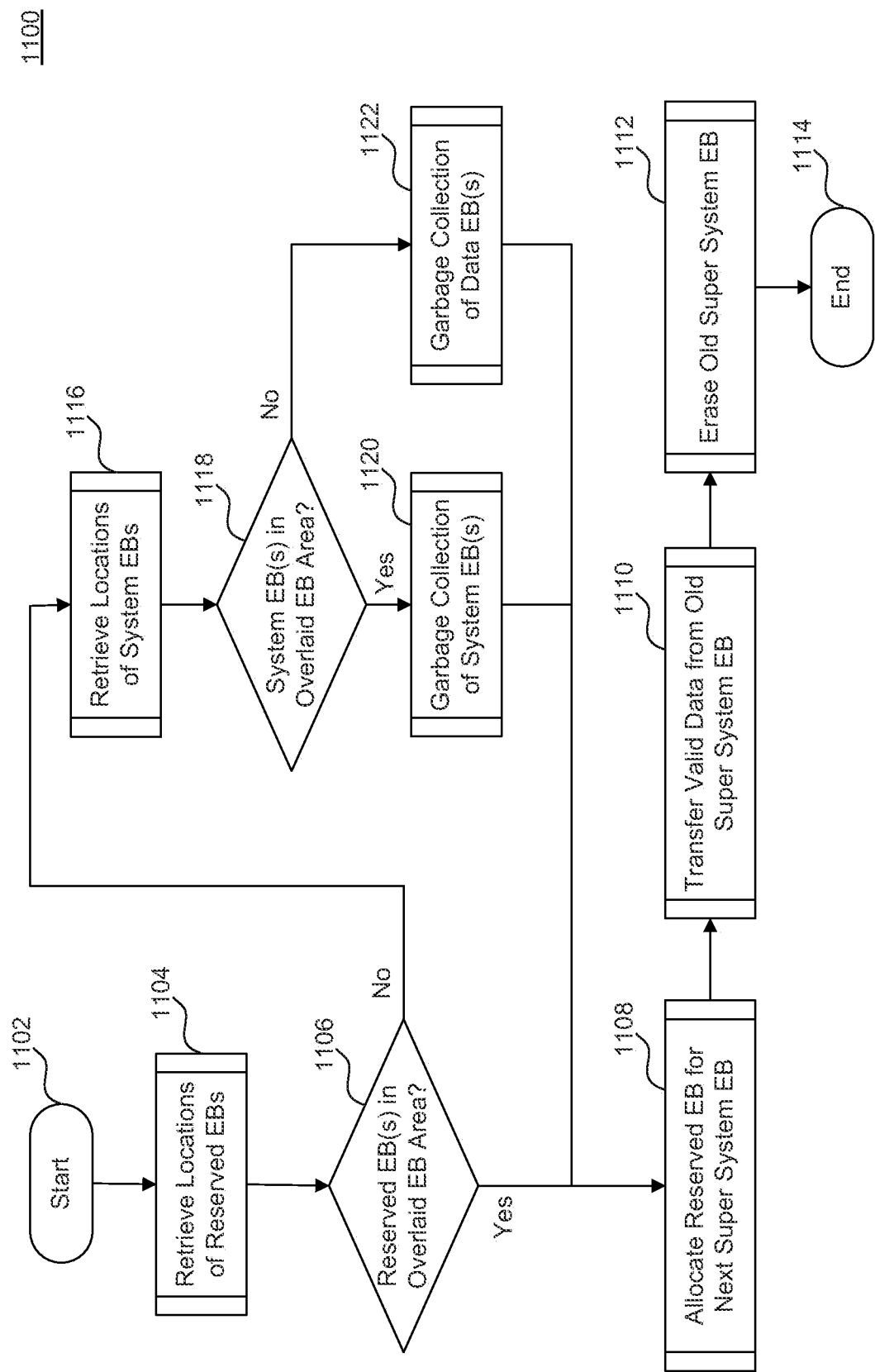
FIG. 11 is a flowchart illustrating an algorithm for garbage collection of a super system EB, according to an example embodiment.

FIG. 11 depicts an algorithm 1100 employed by overlaid EB mapping scheme 500 to perform garbage collection of a super system EB, according to an example embodiment. FIG. 11 shall be described with reference to FIGS. 8 through 10, but it should be understood that algorithm 1100 is not limited to the example embodiments depicted in FIGS. 8-10.

As shown in FIG. 11, algorithm 1100 begins at step 1102 where control passes to step 1104. At step 1104, the locations of common reserved EBs are retrieved, in the form of a random access memory (RAM) table for example. At step 1106, algorithm 1100 determines whether one or more of the common reserved EBs are located within the overlaid EB area, as shown by overlaid EB area 520 in FIGS. 8-10.

If there is one or more common reserved EBs within the overlaid EB area, algorithm 1100 moves to step 1108, wherein one of the common reserved EBs is allocated to be the next super system EB. At step 1110, valid data from the old super system EB is transferred into the next super system EB. Steps 1108 and 1110 correspond to step 822 in FIG. 8. At step 1112, the old super system EB is erased to generate a common reserved EB. Step 1112 corresponds to step 824 in FIG. 8.

If, at step 1106, it is determined that no common reserved EB is located within the overlaid EB area, algorithm 1100 moves to step 1116, wherein the locations of system EBs are retrieved, in the form of a RAM table for example. At step 1118, algorithm 1100 determines whether one or more of the system EBs are located within the overlaid EB area.

If there is one or more system EBs within the overlaid EB area, algorithm 1100 moves to step 1120. At step 1120, one or more of the system EBs are reclaimed to generate one or more common reserved EBs within the overlaid EB area. Step 1120 corresponds to steps 922 and 924 in FIG. 9. Once one or more common reserved EBs are formed within the overlaid EB area, algorithm 1100 performs steps 1108 through 1112 to reclaim the old super system EB.

If, at step 1118, it is determined that there is no system EB within the overlaid EB area, algorithm 1100 shifts to step 1122, wherein one or more data EBs within the overlaid EB area are reclaimed to generate one or more common reserved EBs. Step 1122 corresponds to steps 1022 and 1024 in FIG. 10. Algorithm 1100 then performs steps 1108 through 1112 to reclaim the old super system EB. Algorithm 1100 ends at step 1114.

EB Mapping Schemes Comparison

Figure 12:
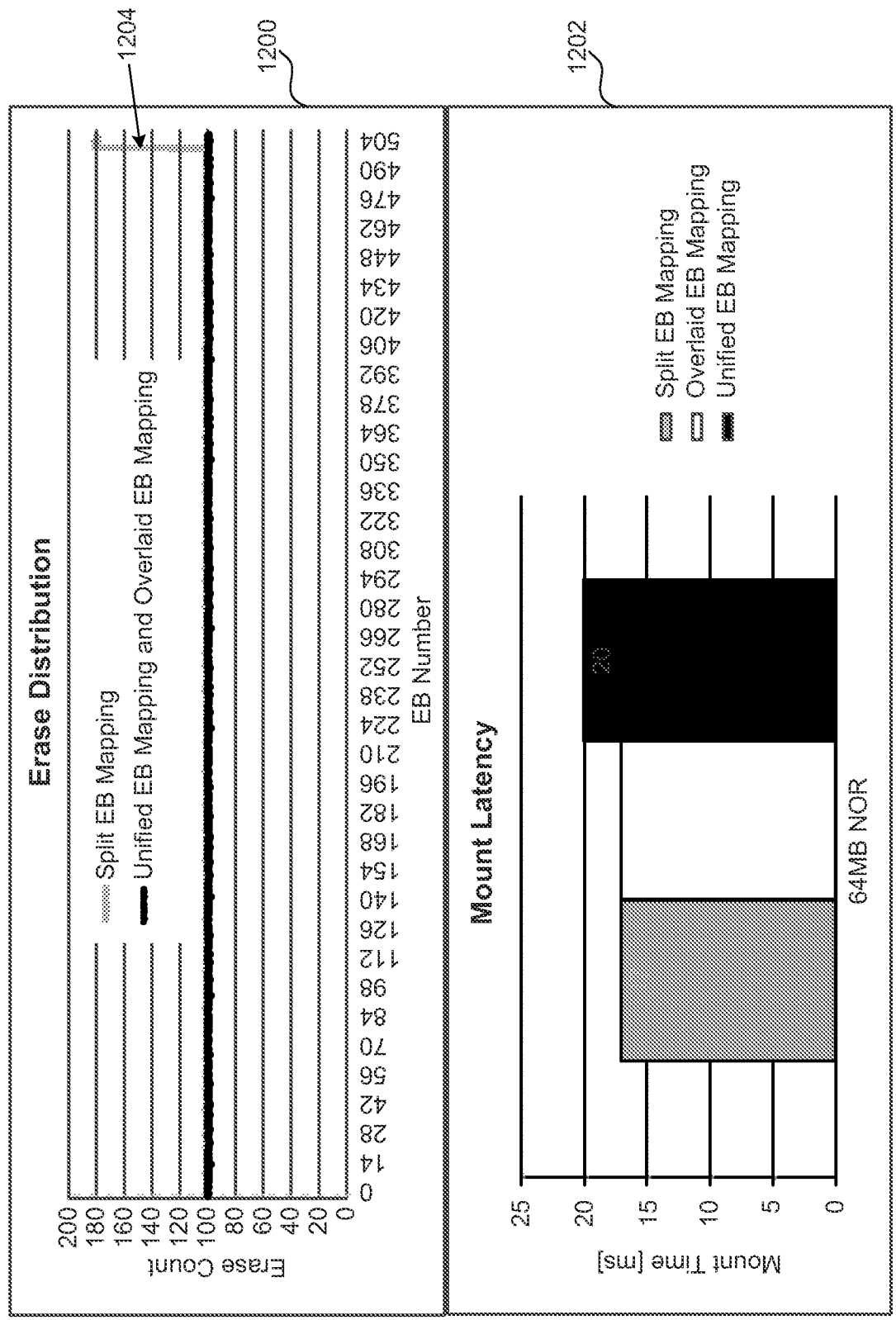
FIG. 12 illustrates a comparison of EB erase counts and mount latencies of multiple EB mapping schemes, according to various embodiments.

FIG. 12 provides a comparison between split EB mapping scheme 100, unified EB mapping scheme 300 and overlaid EB mapping scheme 500 when applied to, but not limited to, a 64 megabyte (MB) NOR flash memory.

Graph 1200 illustrates erase counts for the three schemes, while bar chart 1202 illustrates their mount latencies. In graph 1200, it can be seen that unified EB mapping scheme 300 and overlaid EB mapping scheme 500 have similar erase counts across the EBs. However, for split EB mapping scheme 100, a portion of the EBs have higher erase counts, as indicated by arrow 1204. This portion of EBs corresponds to system EBs as described previously.

In bar chart 1202, split EB mapping scheme 100 and overlaid EB mapping scheme 500 have similar mount latencies, but unified EB mapping scheme 300 has higher mount latency. As described previously, during a mount operation, split EB mapping scheme 100 and overlaid EB mapping scheme 500 have to scan a smaller portion of EBs to locate valid system EBs, while unified EB mapping scheme 300 has to scan across all EBs to locate the valid system EBs.

This comparison confirms that overlaid EB mapping scheme 500 provides both efficient WL and reduced mount latency. Although this comparison uses a 64 MB NOR flash memory, similar observations may be made for other flash memories, regardless of their storage capacities or types.

Example Computer System

Various embodiments can be implemented, for example, using one or more well-known computer systems, such as computer system 1300 shown in FIG. 13. Computer system 1300 can be any well-known computer capable of performing the functions described herein, such as computers available from International Business Machines, Apple, Sun, HP, Dell, Sony, Toshiba, etc.

Computer system 1300 includes one or more processors (also called central processing units, or CPUs), such as a processor 1304. Processor 1304 is connected to a communication infrastructure or bus 1306.

One or more processors 1304 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1300 also includes user input/output device(s) 1303, such as monitors, keyboards, pointing devices, etc., which communicate with communication infrastructure 1306 through user input/output interface(s) 1302.

Computer system 1300 also includes a main or primary memory 1308, such as random access memory (RAM). Main memory 1308 may include one or more levels of cache. Main memory 1308 has stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 reads from and/or writes to removable storage unit 1318 in a well-known manner.

According to an exemplary embodiment, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

In an embodiment, a tangible apparatus or article of manufacture comprising a tangible computer useable or readable medium having control logic (software) stored thereon is also referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 13. In particular, embodiments may operate with software, hardware, and/or operating system implementations other than those described herein.

Conclusion

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the invention should not be limited by any of the above-described exemplary embodiments, but should be defined only in accordance with the following claims and their equivalents.

What is claimed is:

1. A storage device, comprising:
a plurality of physical erase blocks (EBs), physically configured into a first area and a different second area, the physical EBs including:
   a plurality of data EBs configured to store data from a user of the storage device;
   at least one first system EB configured to store system management information for the data EBs; and
   at least one second system EB configured to store metadata including a physical address for the at least one first system EB for locating the at least one first system EB; and
a memory mapping module configured to, in at least a startup operation of the storage device, scan the first area and not the second area, wherein:
the at least one second system EB is restricted to the first area;
the at least one first system EB and data EBs are not restricted to the first area; and
the EBs are block erasable.

2. The storage device of claim 1, wherein the storage device is a storage drive for a computer system.

3. The storage device of claim 1, wherein the physical EBs comprise flash memory.

4. The storage device of claim 1, wherein the memory mapping module is further configured to, upon locating the second system EB, locating the at least one first system EB with the metadata.

5. The storage device of claim 1, wherein:
the plurality of physical EBs further includes
   a plurality of the first system EBs,
   the second system EB including first metadata, and
   at least one third system EB that includes second metadata; wherein
the at least one third system EB is not restricted to the first area.

6. The storage device of claim 5, further including:
a memory mapping module configured to, in at least a startup operation of the storage device,
   scan the subset of physical EBs having the predetermined physical mapping to locate the second system EB,
   locate the at least one third system EB using the first metadata of the second system EB, and
   locate the first system EBs using the second metadata from the at least one third system EB.

7. The storage device of claim 1, wherein:
the data EBs, first system EBs and second system EBs each have a logical mapping to corresponding physical EBs.

8. A method of operating a storage device, comprising:
providing a plurality of physical erase blocks (EBs), each physical EB including a plurality of nonvolatile memory cells erasable as a block, the EBs physically configured into a first area and a second area; and
by operation of a memory mapping module of the storage device,
   scanning only the first area for a second system EB, the second EB being restricted to the first area,
   locating first system EBs using metadata, including physical addresses for the system EBs from the second system EB,
   locating data EBs using system data from the first system EBs to make user data stored in the storage device available to a user; wherein
the first system EBs and data EBs can be located within or outside of the first area, and
the first system EBs do not store user data from the user.

9. The method of claim 8, wherein the storage device is a storage drive for a computer system.

10. The storage device of claim 8, wherein the physical EBs comprise flash memory.

11. The method of claim 8 wherein the scanning of only the first area is performed in a startup operation of the storage device.

12. The method claim 8, wherein locating the first system EBs using metadata from the second system EB includes
   locating third system EBs using metadata from the second system EB, and
   locating the first system EBs using metadata from the third system EBs.

13. A system, comprising:
at least one processor;
at least one memory coupled to the at least one processor by a communication infrastructure;
at least one storage device coupled to the communication infrastructure and including a plurality of physical erase blocks (EB) that each include nonvolatile memory cells configured to be erased together, the physical EBs physically configured into an overlay region and a non-overlay region, and including
   a plurality of data EBs configured to store data from a user,
   first system EBs configured to store system management information for the data EBs and not store data from the user, and
   at least one second system EB configured to store metadata for locating the first system EBs including physical addresses for the first system EBs; wherein
the at least one second system EB is restricted to the overlay region, and
the data EBs and first system EBs are not restricted to the overlay region and a memory mapping module configured to, in a predetermined operation;
  scan only the overlay region for the second system EB,
  locate the first system EBs using metadata from the at least one second system EB, and
locate data EBs using system data from the first system EBs to make data stored in the storage device available to a user of the system.

14. The system of claim 13, wherein:
the physical EBs further include at least one third system EBs configured to store metadata for locating the at least one second system EBs; and
the memory mapping module is configured to, in the predetermined operation,
locate the at least one second system EBs using metadata from the at least one third system EB, and
locate the first EBs using metadata from the at least one second system EB.

* * * * *